Feb. 14, 1956 J. R. PADRICK 2,734,439
EARTHWORKING AND PLANTING IMPLEMENT
Filed June 9, 1949 8 Sheets-Sheet 1

INVENTOR.
John R. Padrick.
BY
Harness, Dickey & Pierce
ATTORNEYS.

Feb. 14, 1956  J. R. PADRICK  2,734,439
EARTHWORKING AND PLANTING IMPLEMENT
Filed June 9, 1949  8 Sheets-Sheet 4

INVENTOR.
John R. Padrick.
BY
Harness, Dickey & Pierce
ATTORNEYS.

Feb. 14, 1956     J. R. PADRICK     2,734,439
EARTHWORKING AND PLANTING IMPLEMENT Filed June 9, 1949     8 Sheets-Sheet 6

INVENTOR.
John R. Padrick.
BY
Harness, Dickey & Pierce
ATTORNEYS.

United States Patent Office 2,734,439
Patented Feb. 14, 1956

2,734,439

EARTHWORKING AND PLANTING IMPLEMENT

John R. Padrick, Roberta, Ga.

Application June 9, 1949, Serial No. 98,107

3 Claims. (Cl. 97—78)

This invention relates generally to a novel implement for preparing the soil and planting seed, and is a continuation in part of applicant's copending patent application for improvements in Deep Tillage Plow, Serial No. 22,783, filed April 23, 1948, now abandoned.

Agricultural experts generally agree that tillage is the primary fundamental of all agriculture and one that has been only slightly improved since the earliest times of man. While labor-saving machines have been developed to enable man to prepare the soil for seeding and to cultivate for the control of weeds, these machines have contributed to the waste of land at an unbelievable speed. In most sections of this country there has been very little increase in average acre yield in the past seventy-five years, and the combined efforts of agricultural experts, tons of fertilizer, and improved seed, have done little more than offset the devastating effects of the tillage methods which have been used. There is, therefore, an absolute necessity for a change in tillage methods, if the possible production potential is to be approached.

An analysis of each inch of soil to a depth of sixteen inches indicates that the first two or three inches have the highest pH content, the most satisfactory bacterial count, and most of the plant food inherent to the soil. However, at this depth, moisture is so inconsistent that growing conditions are seldom satisfactory for the full season. From about the fourth inch down, the score on all of the aforementioned counts is progressively lower, and from about the sixth inch down there is little or no inducement to plant growth.

The average plowing depth at the present time, for both horse-drawn and tractor-drawn implements, is about three and a half inches, and at about that level, in many soils, a hard pan forms that becomes almost impervious to moisture and annual plant roots. Subsequent plowing and fertilizing of the upper layer, where packing and chemical action occur, also help to form a dense layer. This layer effectively restricts the root zone to a few inches between the pan and the surface. Even in soils which are not conducive to the formation of hard pans, there is often a lack of aeration and therefore oxidation, along with a high concentration of the acid-forming minerals, which leave nothing to offer in the way of plant food in the plant root zone. On many thousands of acres of farm land most or all of the topsoil has been swept away and large areas of subsoil exposed. These exposed areas or clay galls are not productive and are hard to reclaim under normal methods because of their dense nature. With the removal of the topsoil, there is no blanket left to retard the excessive runoff of surface water and since the water is not held on them, there is little moisture penetration. Without moisture over a normal growing season, it is almost impossible to secure a protective cover.

Some soils have too much ground water at or near the surface; and this, of course, makes non-productive land. It is usually not a matter of too much water but too little drainage, and if the water table is kept constantly below fourteen inches there is little or no danger to annual plants.

Since the top two or three inches of soil are subject to extreme changes in moisture conditions, and since it seems to be a feature of the natural phenomena for most soil conditioning elements to become more or less fixed at the level where they are placed, it is apparent that the present methods of application are not conducive to the development of a deeper root zone because the placement level is only within the uncertain moisture zone. Restrictive development of concentrated plant food area to the top three inches is not the best practice because of the extremes in elemental activity at the surface.

Lime, one of the best soil conditioners, when applied to soils containing a reasonable amount of organic matter, causes the soil to flocculate or become granular; but lime applied to soils extremely low in, or devoid of, organic material causes just the reverse condition to obtain and thereby defeats one of the major expected benefits. Since the subsoil is extremely low in its content of organic matter, apparently it would be unwise to apply only lime at that level.

Proper utilization of fertilizer is possibly the greatest problem confronting the farmer; however, it is not one that the farmer can be expected to solve. It is doubtful if more than fifty percent of the potential benefit from fertilizer is obtained under present tillage and placement methods and the ramifications peculiar to this problem are manifold.

Fertilizer placement tests with corn on badly depleted land indicate that deep placement gives much more satisfactory yields than shallow. Fertilizer placed at the ten inch level produced nearly twice as much corn as the same amount placed at the three inch level; yet deep placement is not the full answer because conditions in most soils do not naturally approach the ideal.

Most machines in use now, place fertilizer only about three inches below the surface and that depth is definitely too shallow for best results. The action in the soil is upward and fanwise from the placement band; and if the placement is too shallow, the action is expended near the surface where satisfactory moisture conditions are seldom found.

Shallow land preparation is conducive to excessive run-off of surface water and failure to store moisture is very poor husbandry. Yet the farmer is not to blame, because the design of the tillage implements now in use, is such that deeper plowing might well prove disastrous. If the land were plowed deep enough for much of the subsoil to be turned to the surface, the disturbance to the bacterial phenomena would result in poor crop yields.

Many crops do best when planted in furrows. If adequate drainage is not provided, seed planted at a low level are very apt to become waterlogged and rot during periods of heavy rainfall and low temperatures. Implements now in use do not provide for sub-surface drainage except as a separate and expensive operation.

In the not too distant future, the use of dry fertilizer materials will be as obsolete as the tillage methods now in vogue. Dry material is hard to control mechanically and its placement is hard to regulate. Its action in the soil is slow and uncertain, it is expensive to handle and, of necessity, its bulk is out of proportion to the amount of plant food available. Fertilizer applied in liquid or gas form below the soil surface and under such pressure as to effectively force it into the voids in the planting area, will do much toward assuring a higher return for the fertilizing dollar. With present tillage methods, however, liquid or gas fertilizer cannot be efficiently and effectively used.

The primary object of this invention is to overcome the aforementioned problems and difficulties in tilling, planting and cultivating soil, by providing a novel means for preparing the soil to a depth below the topsoil, for subsequent seeding, in which the subsoil is aerated and soil correctives and plant nutrients added thereto (hereinafter referred to as deep tillage).

It is a still further object of this invention to provide an implement of the aforementioned type, in which means are provided for forming the furrow, which means are adjustably connected with the implement so that the depth and width of the furrow to be formed may be varied.

It is a still further object of this invention to provide, in an implement of the aforementioned type, a novel plow stock which is constructed so that there is no need for a colter wheel on the implement, and which has a removable plow point connected therewith, whereby to permit various types of plow points to be used for working the earth below the topsoil in accordance with the soil conditions.

It is a still further object of this invention to provide a novel implement for preparing the soil which permits much more economical farming than has been heretofore possible and which will produce better yield of crops than has been heretofore possible with known methods and implements.

It is a still further object of this invention to provide an agricultural implement for preparing the soil which will provide reservoirs adjacent the planted seed, to prevent excess runoff from heavy rains, while at the same time preventing loss of seed from water-logging and rot during periods of heavy rainfall and low temperatures, by providing adequate drainage of the seed bed, thereby maintaining a relatively substantial moisture supply for the seed over a relatively long period of time, as compared with the inconsistent moisture supply which results with normal tillage methods.

These and other objects of this invention will become apparent from the following detailed description, taken in conjunction with the accompanying drawings, in which.

Referring now to the drawings and more particularly Figs. 1 to 10, it will be seen that the implement illustrated is designed to prepare and plant two rows of crops, but it will be understood that it could be designed to prepare and plant one or more rows of crops. The implement includes a main assembly 21, which in turn includes back to back, longitudinal, angle-like members 23, on opposite transverse sides of the assembly 21. Laterally inwardly from each set of longitudinal angle members 23 is a second set of similar longitudinal angle members 25. The sets of angle members 23 and 25, on each side of the assembly 21, are rigidly interconnected at their front ends by means of a transversely extending, box-shaped frame member 27. The member 27 is connected with the angle members 23 and 25 by any suitable means, such as bolts 29. It should be noted that the transverse member 27 is provided with a plurality of transversely spaced apertures 31, which permit the spacing between the longitudinal members on each side of the main assembly 21 to be varied in accordance with the distance between the row crops to be planted, as will hereinafter appear. The transversely spaced longitudinal members are also rigidly interconnected by means of a transverse member 33, which is similar to the member 27 and which is spaced rearwardly therefrom and connected with the longitudinal members in any suitable manner, such as by bolts or the like. The extreme rear ends of the longitudinal members 23 and 25 on each side of the main assembly 21 support and are interconnected by means of a tool bar 35 which extends transversely across the main assembly 21. The tool bar 35 is slidably connected with the frame longitudinal members by means of hollow box-like bracket members 37, which have a web portion 38 disposed between the angle members 23 and secured thereto by any suitable means, such as bolts 39.

Rigidly connected with the transverse main frame members 27 and 33 is a suitable A-frame 41, formed from a plurality of members 43 which converge at their upper forward ends, in a generally conventional manner, for connection with the upper tension and compression link 45 of a hydraulic lift 47, such as is illustrated and described in the copending application of Charles J. Smith et al., Serial No. 8,444, filed February 14, 1948, now Patent No. 2,667,745, issued February 2, 1954. The lower compression and tension links 49 of the lift are pivotally connected to transverse member 27 at 51. The front ends of the hydraulic lift links 45 and 49 are pivotally connected to a towing vehicle 53, which may be a conventional tractor or a suitable four-wheel drive vehicle such as a "jeep." The lift illustrated is of the type which is operated by the vehicle driver so as to raise and lower the implement and control the depth at which it works the ground, but it will be understood that the implement of this invention could be used with other types of lifts or draw bar units.

The upper end of a generally vertically extending plow stock 55 is disposed between each pair of angle members 23, on each side of the main assembly 21, and is rigidly and detachably secured thereto by suitable means such as bolts 56. A plow shoe 57 is detachably connected to the lower end of each plow stock 55, in any suitable manner, and a plow point 59 is detachably secured to the front portion of each plow shoe 57 in the manner illustrated in Figs. 7 through 9. The plow point may be of any suitable shape and the shape of the point depends upon the condition of the soil which is being tilled. For example, if the soil has not been previously tilled deeply, a point which is designed to penetrate a low draft would be used. A second possible type of point would be one of the expansive type that will crack up the soil below the ground level over quite a large area, or at least over a much wider area than the first point, without disturbing any more of the surface soil than the first point. The type of point illustrated in the drawings is designed to form a generally mole-type channel below the surface of the soil, for reasons which will hereinafter appear. As can be seen from Figs. 7 through 9, the plow point 59 is of a hollow construction and is of a generally triangular shape in cross section. The bottom wall of the point is formed with a generally U-shaped recess or opening 61 which has a plurality of notches 63 around the edge thereof, which are adapted to be engaged by projections 65 in the underside of a plate 67, which is inserted into the hollow portion of the point 59, so as to releasably retain the plate 67 in its proper position within the point 59. The plate 67 is provided with a rectangular opening 69 adjacent the rear end thereof. The plow shoe 57 has a depending lug or tongue 71 formed on the under side thereof which, when the plow point 59 is inserted over the forward end of the plow shoe, will engage the opening 69 in the plate 67, so as to releasably retain the plow point on the plow shoe. The plow point may be removed from the plow shoe by merely inserting a tool between the back end of the plow point and the plow shoe and prying the two apart so that the tongue 71 is moved out of engagement with the opening 69 in the plate 67. With this construction, only the plow point need be hardened and made of especially durable material, while the plow shoe may be made of relatively inexpensive and untempered metal. Then, when the plow point wears out, it may be replaced by a new one and the entire plow shoe need not be replaced, thereby keeping maintenance costs at a minimum.

Both plow stocks 55 have their leading edges disposed on a true radius at 73, so that any fibrous material encountered by the plow stock in its passage through the soil will automatically slide up and down to a central point on the leading edge, at which point disks 75, which will be hereinafter described in detail, will part the material and turn it out of the way. This construction eliminates the necessity of employing a cutting colter on the implement, as the ordinary colter does nothing but part the material so that the following implement portion can lay it aside.

Two disks 75 are mounted on each plow stock, one on each side thereof, and are provided primarily for the purpose of forming a furrow in the ground, at the same time that the plow point and shoe are forming a channel below the ground level. Each disk 75 is supported on the plow stock by means of a mounting plate 79 having three spaced apertures 81 adjacent the upper edge thereof, and an aperture adjacent the lower edge thereof. The plates are secured to the plow stock by bolts 83 and 84. The bolt 83 extends through one of the apertures 81 of one plate, through an elongated vertical slot 85 in the plow stock, and through the corresponding aperture 81 in the mounting plate 79 for the other disk 75, which is on the opposite side of the plow stock. The bolt 84 extends through the lower plate apertures and the vertical slot 85. By loosening the bolts 83 and 84, the plates 79 may be adjusted upwardly or downwardly with respect to the plow stock and by removing the bolt 83 the angular position of the plates 79 may be varied with respect to the plow stock and each other, in accordance with the aperture 81, through which the bolt is inserted. Extending angularly from each plate 79 is a hub member 86 which journals a shaft 87 for each disk 75. The disks 75 are secured to the shafts 87 by any suitable means, such as nuts 89. The disks 75 are therefore rotatably and adjustably connected to the plow stock in a simple and efficient manner. The disks 75 are mounted on each plow stock in such a manner that their forward edges converge towards the leading edge of the plow stock and are substantially tangent thereto so that as the implement is pulled through the ground, the disks will form a furrow and move the soil to the opposite sides of the furrow. It will, however, be noted that there is a slight space between the forward edges of the disks 75 and the plow stock, so that a certain amount of the topsoil may sift down between the disks and plow stock into the subsoil, as will hereinafter appear.

Figures 14, 15, 16, 17, 18, 19, 20:
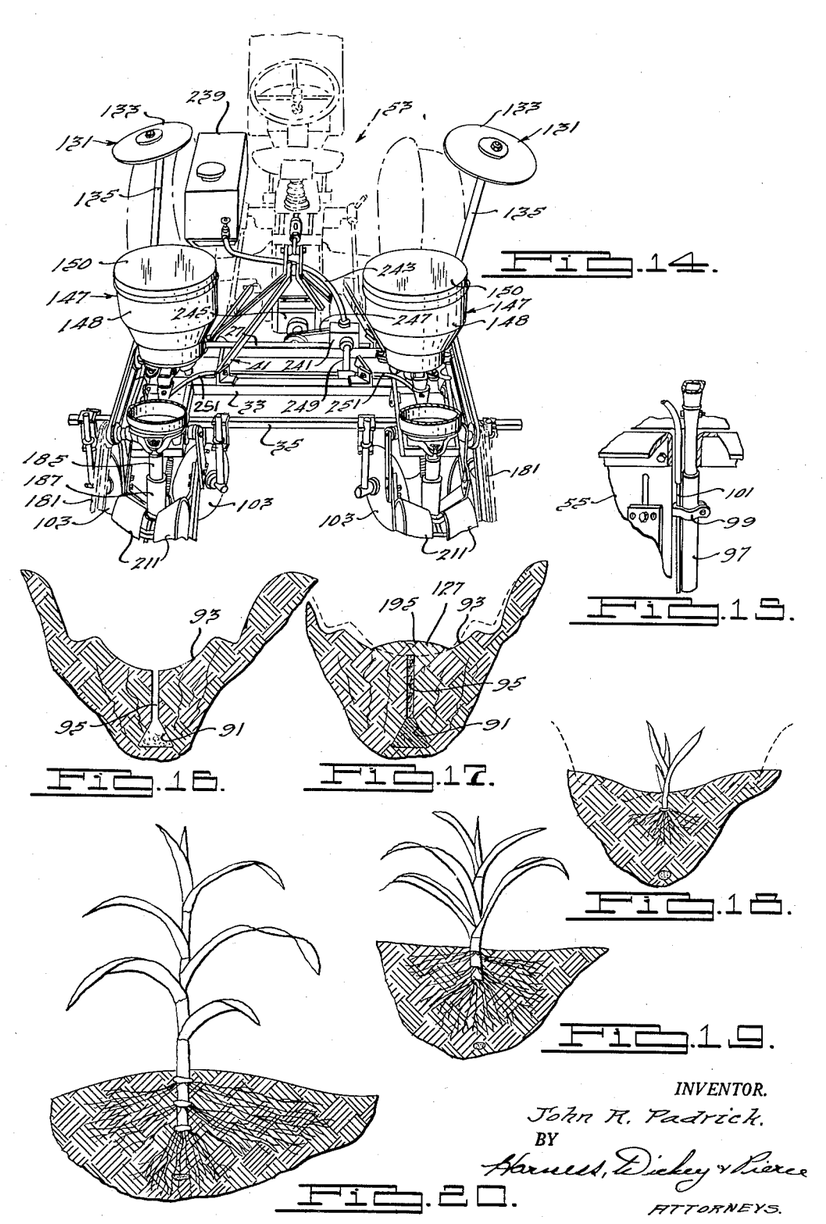
Fig. 14 is a rear fragmentary perspective view, with parts removed for purposes of clarity, of a still further modified arrangement of the implement illustrated in Fig. 1, wherein the implement can deposit liquid fertilizer in the ground.
Fig. 15 is an enlarged view, partially in section and partially in elevation, of a portion of the structure illustrated in Fig. 14 which conducts the fertilizer from its reservoir into the ground.
Fig. 16 is a diagrammatical section of a portion of the soil after it has been partially prepared by the implement illustrated in Fig. 1.
Fig. 17 is a view similar to Fig. 16, illustrating the soil after the seed has been planted therein by the implement illustrated in Fig. 1.
Fig. 18 is a view similar to Fig. 17, which shows the development of the plant after the first cultivation, and indicates the amount and position of the soil which has been moved from the furrow.
Fig. 19 is a view similar to Fig. 18, after the second cultivation, and indicates the root development of the plant in relation to the subsoil and added topsoil.
Fig. 20 is a view similar to Fig. 19, after the third cultivation, showing the development of the root system in the soil.

When the implement is dropped upon the ground and pulled by the towing vehicle, the plow shoe and point 59 will move through the ground a substantial distance below the ground level, a distance of perhaps sixteen inches, and the plow point 59 will, as can be seen in Fig. 16, form a subterranean channel or portion of loose soil 91, in the ground, which channel is in effect interconnected with a furrow 93, formed adjacent the ground level by the disks 75, by means of a vertically extending cut 95, formed by the leading edge of the plow stock. Of course, a certain amount of the soil which is being turned out and moved by the disk will sift through the space between the disks and plow stock, down through the cut 95 and into the channel 91, so that a relatively loose mass of topsoil may be disposed in the subterranean channel.

A tube 97 is adjustably secured to the stock or trailing edge of the plow stock 55, by means of a clamp 99. The lower end of the tube 97 is preferably disposed adjacent to the lower end of the plow stock trailing edge. A second tube 101 is also adjustably connected to the trailing edge of the plow stock adjacent to the tube 97, and its lower end terminates at approximately the same point as the lower end of the tube 97. The tubes 97 and 101 serve to deposit fertilizer in the subterranean channel. The tube 97, as will be hereinafter brought out, is adapted to deposit dry fertilizer in the subterranean channel, while the tube 101 is adapted to deposit liquid or gas fertilizer. The tube 97 also serves the additional purpose of aerating the subterranean channel, so as to prevent the formation of any vacuum in the channel which might be caused when the plow shoe and point are pulled through the ground, and also of bringing oxygen into the subterranean channel, for a purpose which will hereinafter appear. As the fertilizer applying tubes 97 and 101 are adjustably connected with the plow stock, the depth of placement of the fertilizer may be varied in accordance with the type of fertilizer used and the type of plant being fertilized. For example, when phosphorus and potash fertilizers are used, it appears that they should be placed near the seed to help the initial growth of the seed. Tests seem to indicate that the primary benefits from this type of fertilizer are derived during the initial growth of the plant. However, when nitrogen type fertilizers are used, they should be placed relatively deep in the soil, so as to aid the growth of the plant during its entire growing period. That is, this type of fertilizer aids plant growth during the entire life of the plant and not just during the initial growing period, as in the case of phosphorus and potash fertilizers. Furthermore, the depth of placement of fertilizers may vary in accordance with the type of plant which is being fertilized. With some plants, such as peanuts and the like, the fertilizer cannot be placed too near the plant or seed, as it will cause burning thereof, while, with other types of plants the fertilizer may be placed relatively close to the plant without causing any damage thereto.

A pair of furrow closing disks 103 are provided rearwardly of each of the disks 75. The furrow closing disks 103 are rotatably supported on the lower end of a vertically extending bar or shaft 105 and each shaft 105 is adjustably secured to the tool bar 35 by means of a clamping device 107. The clamping device 107 includes a case member 109, having a vertically extending wall portion 108, upper and lower flanges 110, each of which has a semi-circular recess 111 in the rear face thereof for receiving the shaft 105, and a forwardly extending horizontal flange portion 113, vertically intermediate flanges 110, which engages the under side of the tool bar. The upper flange 110 extends forwardly beyond the vertical wall 108 of the member 109 and has a downturned flange portion 115 on the extreme forward end thereof. The device 107 also includes plate 117 which rests upon the upper surface of the tool bar and has an upturned flange 119 along its rear edge, which fits between the downturned flange 115 of member 109 and the vertical wall 108. A bolt 121 extends vertically through the plate 117 and flange portion 113 of the member 109, forwardly of the front face of the tool bar, so as to clamp the device 107 to the tool bar, in any desired adjusted position. An eye bolt 123 is disposed between the upper and lower flanges 110 of the member 109 and the shaft 105 extends therethrough, and the threaded shank portion of the eye bolt extends through the vertical wall portion 108 of member 109. By tightening a nut or the like on the shank of the eye bolt the shaft 105 will be clamped against the flange 110 and held in any desired position. This construction permits the spacing between the disks 103, as well as the vertical position of the disks, to be easily varied, so that the disks 103 will either partially fill in the furrow formed by the disks 75, so as to provide a cover 127, as shown in Fig. 17, or completely fill in the furrow, depending on the type of crops which are to be planted.

Pivotally mounted on the front portion of the main assembly 21, at each side thereof, are row markers 131. Each row marker comprises a disk 133 rotatably mounted on a shaft 135 and the inner end of the shaft is pivotally connected to the main frame in a suitable manner such as by means of a bracket 137 and a reinforcing arm 139, so that the disk 133 can be swung outwardly and dropped down onto the ground to indicate to the vehicle driver where the adjacent row is to be planted and tilled. When it is desired not to use the members, they may be raised to the vertical position shown in the drawing.

A planting and fertilizing assembly 141 is detachably connected to the main assembly 21, so that the implement is being pulled through the ground the planting and fertilizing operations will take place simultaneously with the soil working operation, and so that the fertilizer and seed will be deposited in the correct portion of the soil that has been worked. Two of such assemblies are employed on the two row implement illustrated, but the number of such assemblies will vary in accordance with the number of rows to be worked at one time. One of the planting and fertilizing assemblies is shown in its detached form in Fig. 10, and as both of these assemblies are identical and are detachably connected with the main frame in the same manner, only one will be described in detail.

As can be seen in Fig. 10 and Figs. 1, 2 and 3, the assembly 141 includes a rectangularly shaped frame 143 having a frame or support assembly 145 of a fertilizer hopper and dispensing device 147 mounted thereon, adjacent the forward end thereof. A suitable hopper 148 is supported on the assembly 145 and has a removable cover 150 so that the hopper can be filled with dry fertilizer. Rotatably mounted in the fertilizer assembly 145 is a generally cross-shaped agitator 149 which is rotatably driven by a pulley 151 mounted on a pulley shaft 153, which drives the agitator through suitable gearing, in a conventional manner. The fertilizer assembly 145 is formed to provide suitable outlet or discharge passage 155, through which fertilizer is discharged when the agitator is driven. Suitable control means 157 are provided for controlling the amount of fertilizer which is discharged from the hopper. Connected with the fertilizer assembly 145, at the underside of the outlet passage 155 is a tube 159, which depends therefrom and is telescopically received in the upper end of the tube 97, so that fertilizer will be discharged into the soil through tube 159 and tube 97. The pulley 151 may be driven in any suitable manner, but is shown as being driven by a belt 163, which is connected with ground-engaging wheel 165 on the planting and fertilizing assembly, in a manner which will be hereinafter described. Each frame 143 is detachably connected to the longitudinal members 23 and 25 of the implement main assembly 21, at longitudinally spaced points, by any suitable means such as bolts 160. By removing these bolts the frame 143 may be removed from the main assembly for reasons which will hereinafter appear.

Figure 1:
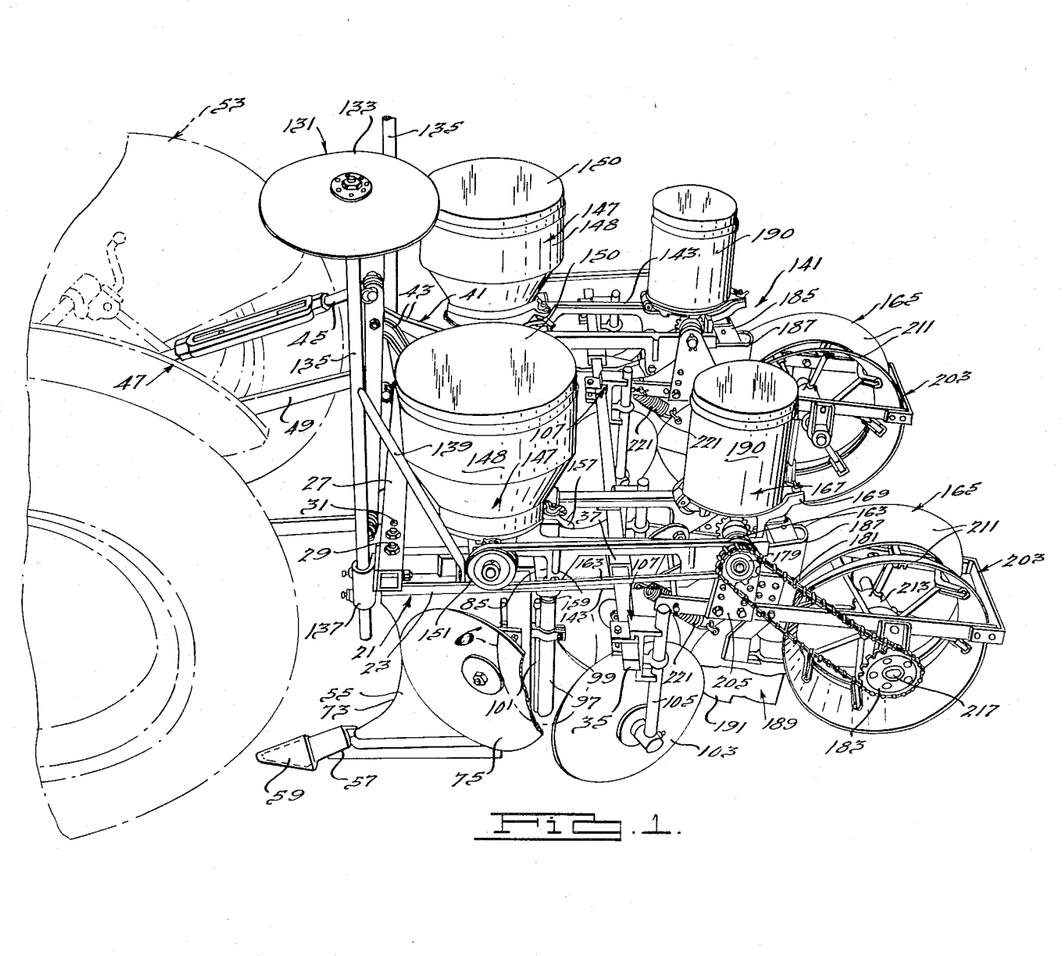
Figure 1 is a side perspective view of the implement of this invention, connected to a towing vehicle.
Figure 2:
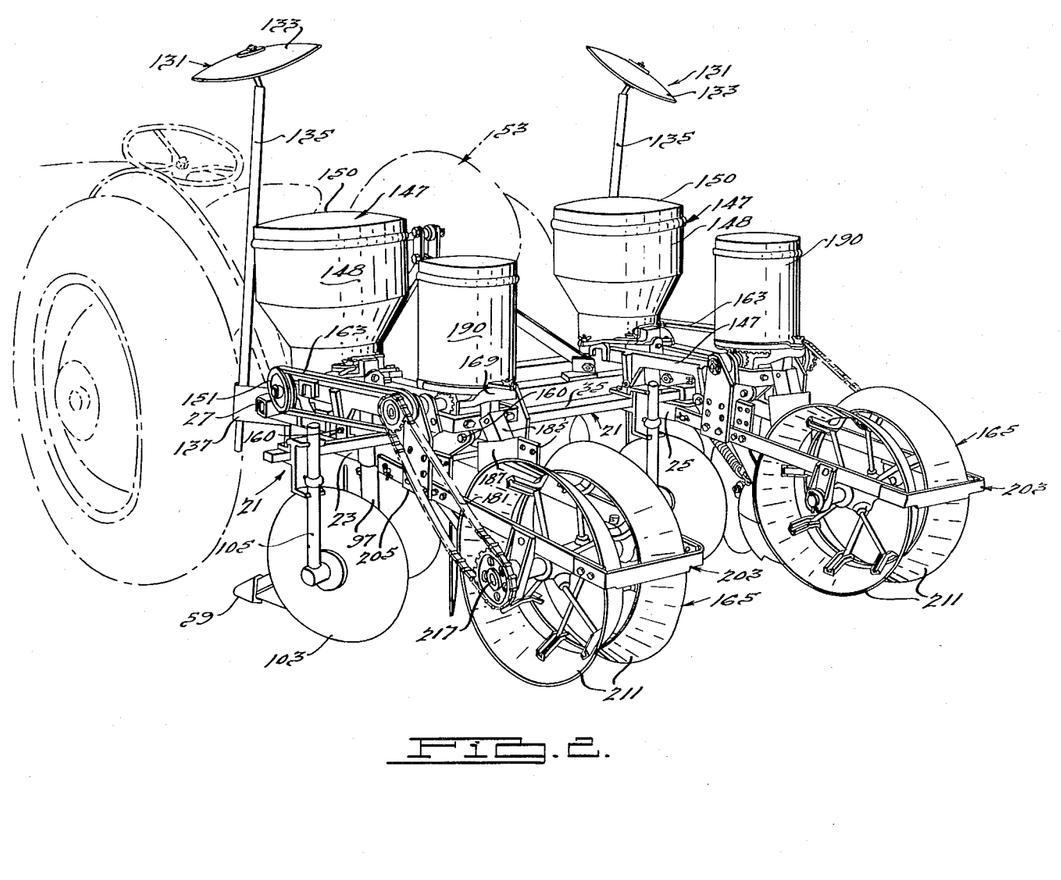
Fig. 2 is a rear perspective of the device illustrated in Fig. 1.
Figure 3:
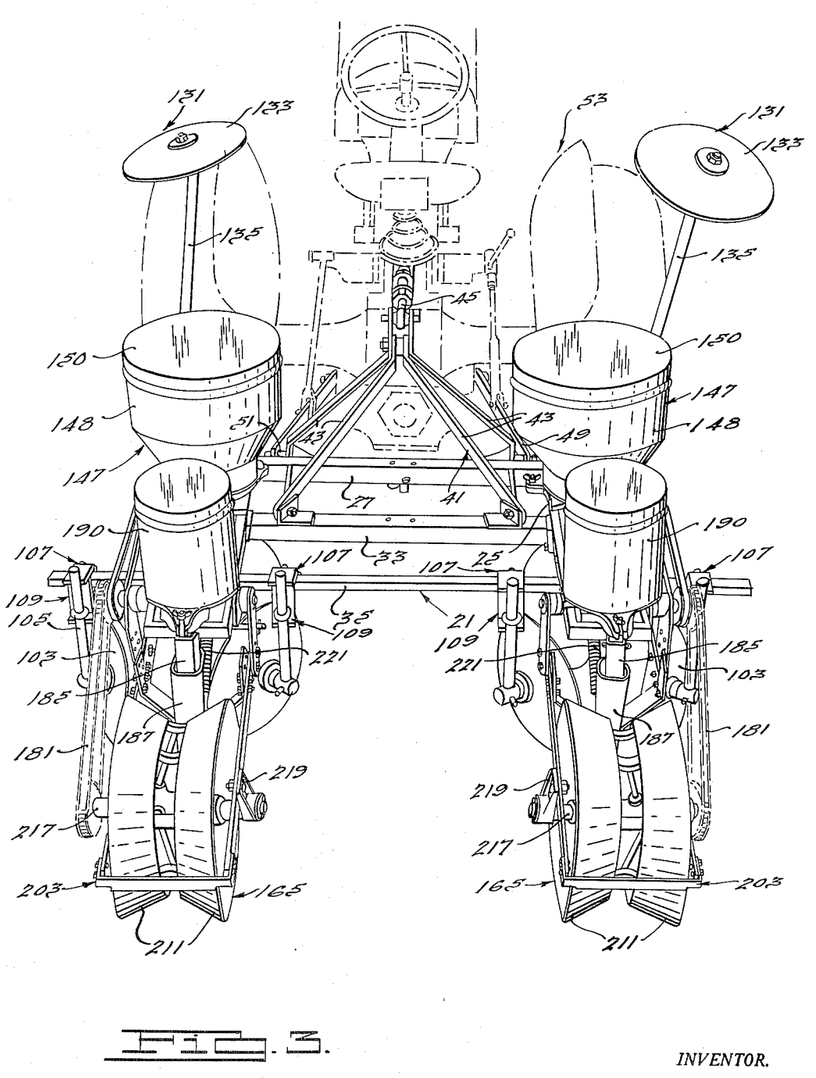
Fig. 3 is a top perspective of the device illustrated in Fig. 1.
Figure 4:
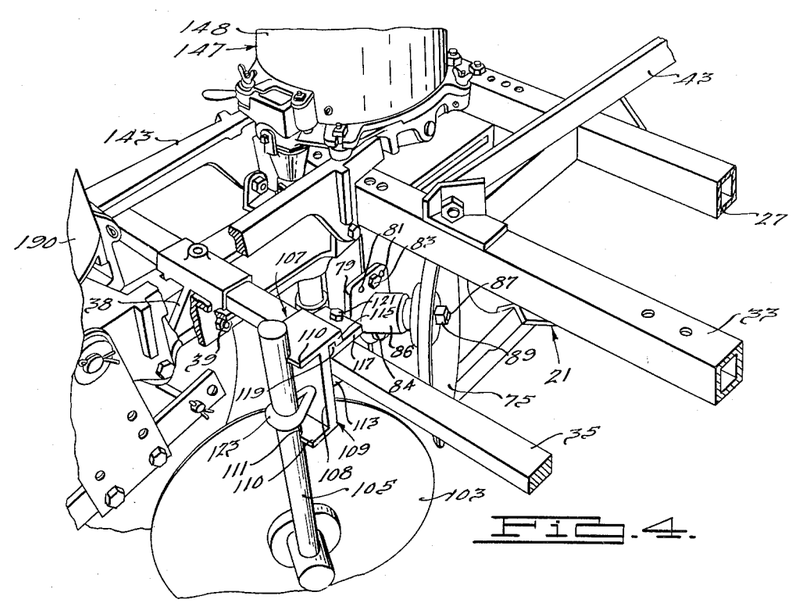
Fig. 4 is an enlarged fragmentary side perspective view of a portion of the structure illustrated in Fig. 1.
Figure 5:
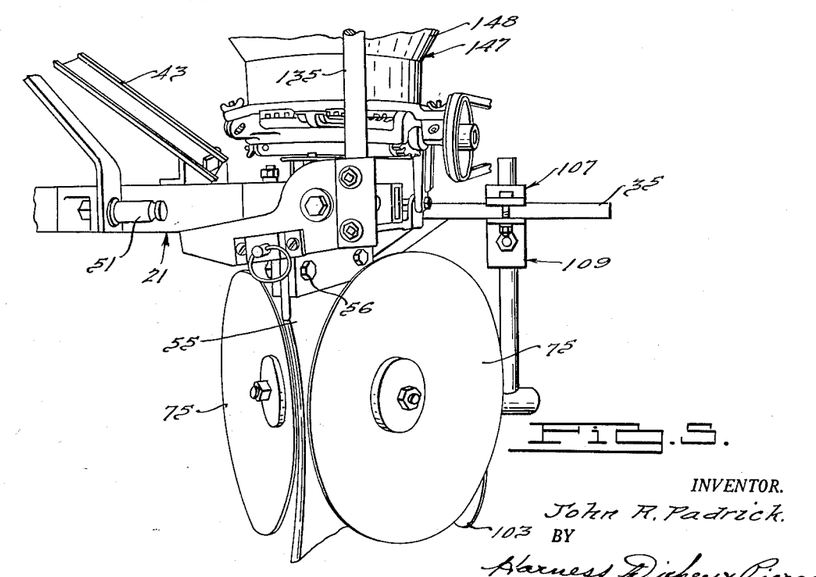
Fig. 5 is an enlarged fragmentary front perspective view of a portion of the structure illustrated in Fig. 1.
Figure 6:
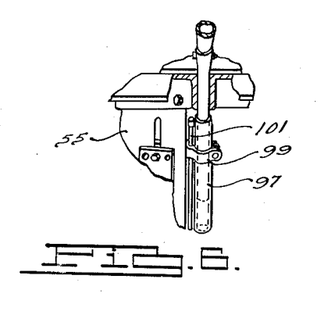
Fig. 6 is an enlarged fragmentary view, partially in section and partially in elevation, of the structure illustrated in Fig. 1.
Figure 7:
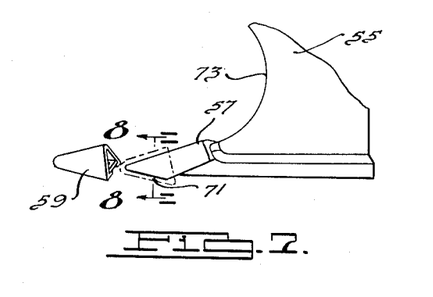
Fig. 7 is an exploded side elevation view of the lower portion of one of the plow stocks and shoes of the device illustrated in Fig. 1.
Figure 8:
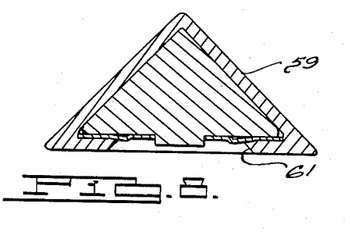
Fig. 8 is an enlarged sectional view of the structure illustrated in Fig. 7, taken along the line 8—8 thereof.
Figure 9:
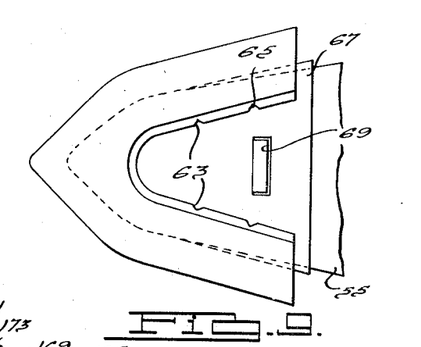
Fig. 9 is an enlarged bottom plan view of the structure illustrated in Fig. 8.
Figure 10:
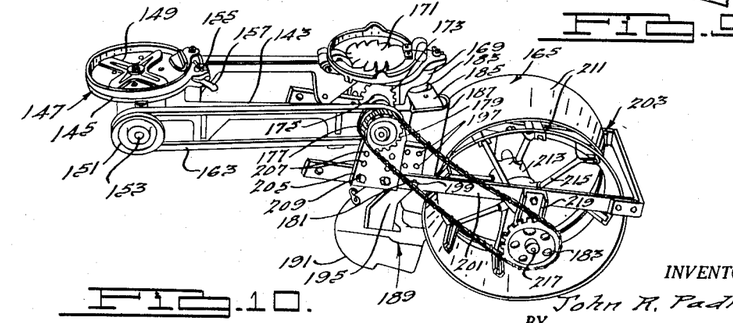
Fig. 10 is a side perspective view of the fertilizing and planting assembly illustrated in Fig. 1 and removed from the remainder of the implement, with the fertilizer and planter hoppers removed for purposes of clarity.

A planting mechanism 167 is mounted on the frame 143, adjacent the rear end thereof, as can be seen in Fig. 10. The planting mechanism includes a bottom or support assembly 169 in which is mounted an apertured agitator or seed discharge plate 171. The agitator plate 171 is formed on the under side thereof, with a ring gear (not shown), which is adapted to be driven by means of gear 173 mounted on shaft 175. The shaft 175 in turn is rotatably supported on the frame 143 by any suitable means and has a pulley 177 on the outer end thereof, over which the belt 163 extends. The shaft 175 also has a sprocket 179 connected therewith, and a chain 181 extends between the sprocket 179 and a sprocket 183, connected with the ground wheel 165, so that as the ground wheels 165 are rotated, shaft 175 will be rotated, and will drive the agitator plate 171 of the planting mechanism as well as the agitator 149 of the fertilizer mechanism. The planting mechanism assembly 169 is formed with a suitable outlet or discharge conduit 183 which has a pipe 185 connected therewith and extending down into a tube or conduit 187, which in turn has its lower end connected with a planting shoe 189. A suitable hopper 190 is mounted on the assembly 169 and is adapted to hold seed. When the implement is pulled through the ground one seed at a time is discharged from the planting mechanism and deposited in the ground, as will hereinafter appear.

The planting shoe 189 may be formed in various ways, but is shown as being a casting having a leading edge 191 which is adapted to form a small trench 193 in the furrow list 127, as can be seen in Fig. 17. Side wall portions of the shoe diverge rearwardly and their bottom edges are stepped upwardly intermediate their ends. The rear portion of the planting shoe is hollow so as to permit seed to be deposited from the planting mechanism into the trench. The planting shoe 189 is adjustably connected with the planting and fertilizing assembly 141 by means of bracket arms 195 which have their lower ends rigidly connected with the planting shoe and their upper ends provided with a plurality of vertically and horizontally spaced apertures 197, through any pair of which bolts 199 may be extended so as to adjustably connect the planting shoe to arms 201 of a supporting frame 203 for ground wheel 165. The arms 201 in turn are connected to the frame 143 by means of bracket plates 205, the upper ends of which are supported on the shaft 175 and the lower portions of which are provided with a plurality of horizontally and vertically spaced apertures 207. Bolts 209 connect the wheel supporting frame 201 to the plates 205, in any desired position with respect to the frame 143. Thus, the position of the wheel supporting frame 203 can be adjusted relative to the frame 143, and the position of the planting shoe 189 can be adjusted vertically relative to the wheel supporting frame. It will, however, be noted that the planting shoe as well as the fertilizer mechanism are, when the implement is entirely assembled, located in a predetermined position with respect to each other and to the plow stock, so that the planting and fertilizing will be in an exact predetermined portion of the tilled soil.

Each ground engaging wheel 165 is of the split type and is formed with a pair of laterally spaced, angularly disposed rims 211. The rims 211 are connected to a central hub 213 by suitable spokes 215 and the hub is connected with an axle or shaft 217 which is rotatably connected with the wheel supporting frame 203 by means of brackets 219. The inner edges of the rims 211 are disposed on opposite lateral sides of the leading edge of the planting shoe 189, so that when the seed is planted in the trench 195 (Fig. 17), the wheel rims will compress the soil on opposite sides of the trench 195, but will not compress or compact the soil directly on top of the seed, for reasons which will hereinafter appear. In order to insure adequate compacting of the soil on opposite sides of the seed trench, a tension spring 221 is connected between the planting shoe 189 and the tool bar 35, so as to continually exert a force which will hold the planting shoe and ground-engaging wheel under tension against the soil.

While the vertical position of the planting shoe and the ground engaging wheels relative to the frame member 143 can be varied, there is, because of the rigid connection of the frame member 143 with the main assembly 21, a predetermined relationship between the plow shoe, the plow stock, fertilizing and cultivating disks, fertilizer tube, planting shoe and ground wheels, which will always insure that the soil is properly broken up below its ground level, that the fertilizer is deposited in exactly the right position and that the furrow is opened and partially closed in the right position with respect to the subsoil channel, and that the seed is planted in the proper position in the furrow list, while the furrow list is properly compacted with respect to the seed. The fact that the implement is arranged and assembled in the manner described, permits the tillage, fertilizing and planting operations to take place simultaneously and especially efficiently. It would not be possible to obtain the same results in as efficient or satisfactory manner if a plurality of separate implements were employed, such as planter or fertilizer mechanisms which were separated from the tillage implement.

Figure 13:
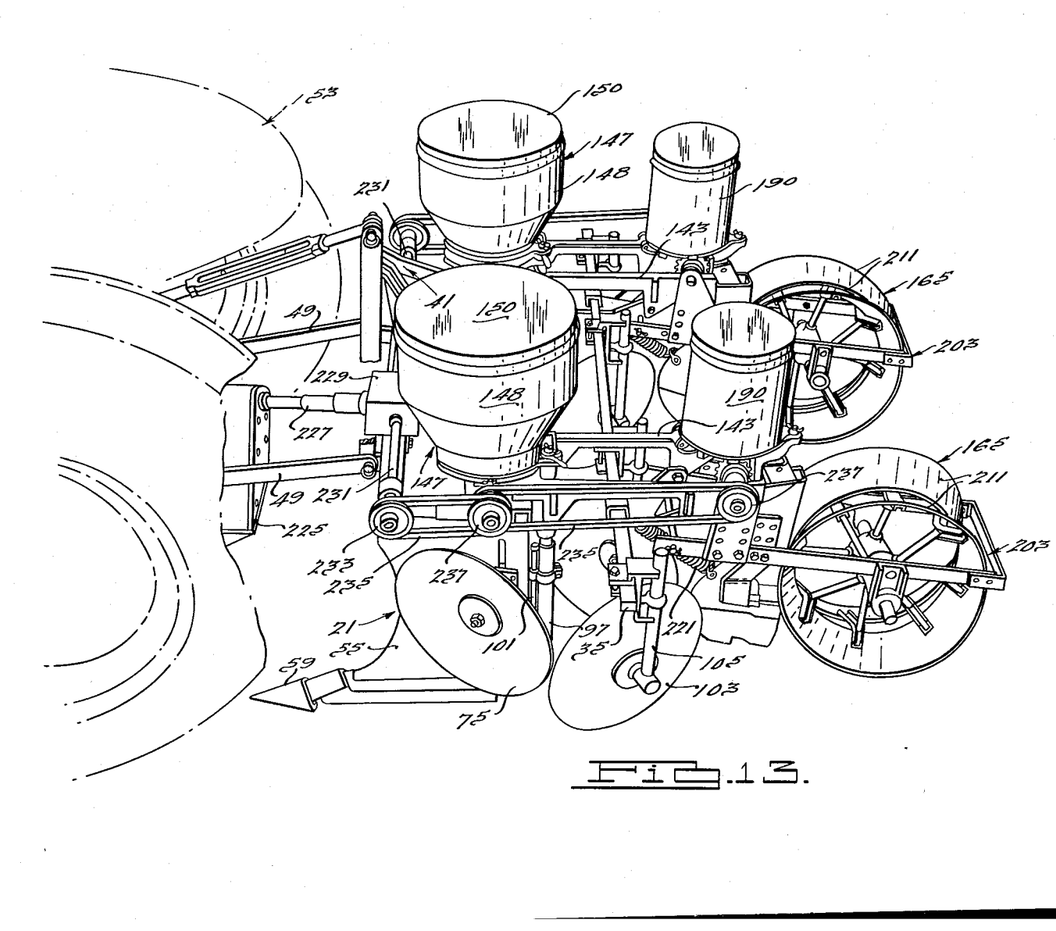
Fig. 13 is a side perspective view of a modified arrangement of the implement illustrated in Fig. 1, wherein the various operating parts are driven from the towing vehicle power take off.

Referring now to Fig. 13, it will be seen that if it is desired to drive the planting and fertilizing mechanisms from a power take off 225 of the towing vehicle, rather than by means of the ground wheels of the implement, a suitable drive shaft 227 is connected to the power take off and in turn is connected by any suitable means, such as gear box 229 to laterally extending jack shafts 231, which carry pulleys 233 on the opposite ends thereof. The pulleys 233 are connected to the planting mechanism and fertilizing mechanism through suitable belts 235 and pulleys 237. When the planting and fertilizing mechanisms are being driven through a vehicle power take off the chain drive from the ground wheels to these mechanisms is, of course, eliminated.

Referring now to Figs. 14 and 15, it will be seen that if it is desired to use liquid or gas fertilizer instead of, or in conjunction with, dry fertilizer, such as is normally placed in the fertilizer hopper 147, a tank 239 is mounted in the rear of the implement towing vehicle and connected to a suitable pump 241, by means of a conduit 243. The pump in turn is connected to the vehicle power take off 245 by means of belt and pulley arrangement 247. A conduit 249 is connected to the pump 241, and to laterally extending conduits 251, which in turn have their free ends connected to the small tubes 101 extending down the trailing edge of the plow stocks 55. In this way, the implement can be employed to deposit either or both dry and liquid fertilizers to the soil below the ground level, for reasons which will hereinafter appear.

The implement described above provides an efficient and economical means of carrying out the deep tillage method, as well as the actual planting of the seed. As has been previously stated, deep tillage is a method of preparing earth for seeding, to a depth below the topsoil, and this preparation constitutes a good deal more than merely cracking the earth or subsoil such as has been previously practiced when a farmer merely subsoiled his field. Subsoiling has in general been discouraged in recent times, because most soils, below the top level, are not conducive to plant growth, due to the presence of anaerobic bacteria and because of high concentrations of minerals which are conducive to a low pH value in the subsoil. Plants generally will not grow in the subsoil because of low pH value and repulsive bacteria. The deep tillage method permits the utilization of the subsoil to more efficiently and economically produce better plants. With the deep tillage methods, and by the use of the aforementioned implement, it is even possible for a farmer to work a field without any prior preparation.

The implement is merely dropped down onto the ground and pulled by the towing vehicle. The plow point 59 moves through the subsoil at whatever depth the implement is adjusted for, for example from seven to fifteen inches below the ground level, so as to form the subterranean channel 91, in accordance with the shape of the plow point. The furrow forming disks 75 form the furrow 93 at the adjusted depth and width, and the plow stock connects the furrow with the channel through the vertical cut 95. The tube 97, in which the fertilizer hopper tube 159 is telescoped, and which has its lower end disposed adjacent to the channel 91, allows for aeration of the channel, that is the drawing into the subsoil of great quantities of air during the progress of the implement through the soil. The tube and fertilizer mechanism also allow for placement of specific elements, such as lime, magnesium, etc., that will act as conditioners for the soil. These factors will induce aerobic bacteria into the subsoil, which hasten oxidation in the lower areas. Furthermore, with an implement of this type the hydrogen ion concentration or pH of the soil may be brought to a value which is the best for the particular crop which is to be planted. Most plants prefer a soil which approximates a neutral point of pH 7, while it has been found by tests that at ten inches below the surface the pH may be down to 4 or 5. The pH value gets progressively smaller from the surface downward, but by following the deep tillage method it is possible to raise the pH value, through oxidation and the application of soil correctives, to whatever pH value is best for the crops.

The fertilizer applying mechanism also allows for the proper placement of fertilizers in the subsoil at a desired depth, and the depth of placement may be varied in accordance with the type of fertilizer used and the type of plant being grown, as previously described. Tests have shown that fertilizer placed in the subsoil produces much more corn than the same amount of fertilizer placed at or near the ground level of the soil. At the present time improper utilization of fertilizer is one of the greatest problems confronting the farmer. For example, nitrogen is the most volatile element of all of the elements considered as plant nutrients. It is readily dissipated, both in ammonia form and in the nitrate form. Its passage through the soil is more readily upward toward the air than in other directions, away from the point of application. Therefore, a heavier blanket of soil over the point of application will help to absorb the escaping material and at least retard its escape over a much longer period. In normal tillage methods, no way has been devised whereby nitrogen bearing material can be placed to the most advantageous depth. With the deep tillage method, the placement of the material is approximately three to four times as deep as with normal tillage methods. Therefore, it can be readily appreciated that a much greater soil mass is available for blanketing the nitrogen bearing material and retarding its dissipation.

Nitrogen in the form of ammonia is highly volatile, but it is the most inexpensive form of nitrogen for use as a fertilizer. At temperatures of from 100° to 120° ammonia is dissipated in a very short time, and if it is placed near the surface of the ground, as in normal tillage methods, in the hot growing season, it is dissipated so rapidly that only a small benefit can be derived by the plants. However, if the ammonia liquor is placed at from ten to twelve inches below the surface, the soil mass at that point is relatively higher and dissipation is correspondingly many times slower. In fact, some benefit may be obtained as long as three years after the placement of the material at points deep in the soil. Thus, the deep tillage method, and the implement of this invention, permit the placement of relatively inexpensive liquid or gas fertilizers, at depths substantially below the ground level, and when the furrow closing disks 103 move over the point of placement of the fertilizer, the fertilizer is properly covered to prevent its dissipation, while at the same time the surface soil tends to sift through the vertical cut into the subsoil channel and cracks and carry bacteria and other desirable organisms into the subsoil, so as to help in the formation of new areas beneficial to crop production.

It will thus be appreciated that with the implement and method of this invention, the productive growing zone of the soil is greatly deepened by the placement of soil correctives and nutrients through the fertilizer mechanisms previously described.

After the furrow closing disks 103 have formed the cover 127, as shown in Fig. 17, or have completely closed the furrow, in accordance with the type of crop which is to be planted, the planting shoe 189 moves through the middle of the cover 127 and forms a seed trench 195 which, as illustrated in Fig. 17, is preferably midway between the sides of the cover. It should be noted that in crops such as corn the top of the cover will be below the normal ground level, so that the seed will be planted below the ground level and when the plant begins to grow it can be cultivated by implements which are towed by vehicles having relatively low ground clearance, for a greater length of time than if the seed were planted at or above the normal ground level. After the trench 195 has been formed by the planting shoe, the seed is dropped therein through the operation of the planting mechanism, which is driven either from the ground wheels 165 or the vehicle power take off. The seeds will be spaced in accordance with the setting of the planting mechanism. After the seed has been dropped into the trench 195, the ground engaging wheels 165 will move over the portion of the cover 127 adjacent to the seed. As has been previously pointed out, the inner edges of the ground wheel rims 211 are disposed on opposite sides of the seed so that the seed proper will not be packed into the ground. However, as the rims 211 are annularly disposed, they will compact the cover on each side of the seed so as to in effect form a trench between the opposite lateral edges of the cover and the side wall of the furrow 93. The list will be in effect crown-shaped, with the seed disposed at the uppermost point, and the seed will be covered by unpacked soil when the remainder of the list is compacted. Therefore, in the event of heavy rain or the like, the water will flow down into the trenches at each side of the list and will not wash out the seed. At the same time, due to the breaking up of the subsoil, the water can drain into the subsoil and any surplus water carried away so as to prevent the seed and topsoil from becoming waterlogged. In addition, the trench and deep tillage will provide reservoirs to prevent excess runoff of the water from heavy rain and it will virtually eliminate the need for terraces on most soils. Still further, this deep tillage method provides, in addition to the adequate drainage for the seed bed, a moisture reservoir below the surface, far more extensive than that provided by any normal tillage implement, and this large reservoir provides more moisture over a much longer period than does the shallow blanket obtained by normal tillage methods. As the root zone of the plants is increased by the method and implement of this invention, the concentration of roots is allowed at a depth in the soil where the moisture content is most nearly constant, and since moisture is liquid for carrying the nutrients into the plant itself, this is important in gaining an increase in production.

It will thus be appreciated that with the implement of this invention a stubble field may be subsoiled, fertilized, listed, planted and the soil firmed in such a way that rain will not sand the seed or furrow over and will not waterlog the seed, all in one operation which is simple and inexpensive.

The deep tillage method furthermore permits the enhancement of the nitrogen content of the soil and prevents or reduces sheet erosion in other manners. For example, in certain parts of the country, winter cover crops are planted to enhance the nitrogen content of the soil and these plants are generally legume plants. One of the major problems in connection with cover crops has been the disposition of them before or at the time of planting of the subsequent "cash" crop. That is, it has been necessary to turn under winter cover crops and let the field lie from two to three weeks for decomposition to take place to the extent that it is safe to plant a subsequent crop. During the process of decomposition, nitrogen is drawn from the soil into the plant mass to hasten plant decomposition. During this period insects, especially cut worms and others of a kindred nature, hatch and become active in the warm plant mass. When the following "cash" crops are planted the worms are nearing their mature stage and do considerable damage to the young seedlings of the subsequent crop as they begin to appear above the ground. Also, with this method of disposing of cover crops, the plant roots on which the nitrogen nodules have formed, are exposed on the surface. This exposure of these organisms tends to hasten the dissipation of the nitrogen which has been stored through the growing season.

Furthermore, with normal tillage methods, three operations prior to the preparation for planting have been necessary. It has been necessary to first turn under the cover crop or ground cover, then smooth the soil and then, immediately prior to planting, provide a second light working of the topsoil. These operations are, of course, expensive, and in deep tillage these costs are eliminated, in that no prior preparation for planting is necessary. That is, the complete operation is effected at one time, as previously brought out.

In addition to the reduction in cost of preparation, the deep tillage method effects a saving in the nitrogen which the cover crop has stored in the soil, in that the roots, where the accumulation of nitrogen is heaviest, are left below the ground surface, except in the narrow line adjacent to and under the seed rows. The normal cover crop produces a considerable amount of nitrate nitrogen and thus can materially reduce the cost and the amount of nitrate nitrogen which must be applied by the farmer. If the storage nodules of the cover crop are exposed on the surface, as in normal tillage methods, a very large percentage of this nitrogen is dissipated through the denitrification process on the surface.

In deep tillage only an area covering about one-fourth of the soil surface is disturbed, and the cover crop roots and tops are pushed to the shoulders above the furrow before the denitrification is completed and the subsequent first cultivation of the planted crop has taken place, which will cause this matter to be pushed back to the edges of the water furrow and covered with soil, as will hereinafter appear. There is, therefore, only a small portion of the cover crop nitrogen lost with the deep tillage method, while almost half of the nitrogen is lost from the cover crop when normal methods are used. Furthermore, in the deep tillage method the seed is placed below the point of decomposition of the cover crop rather than above, and the heat that is generated during the decomposition of the cover crop passes off without damaging the seed. As has been previously pointed out, in the deep tillage method the plow moves through the cover crop and leaves it as it stands, so that it is not turned over, and in subsequent cultivations, using the deep tillage method, the overburden, or that portion of the cover crop on top of the ground, is cut and torn to pieces by the disks used for cultivation. This overburden is, therefore, worked in toward the seedling plants, to serve as a mulch and fertilizer, and in this way competition from the old crop is eliminated.

In certain areas green manure crops are planted in the fall and are normally turned under in the spring. These plants are non-leguminous and therefore fix no nitrogen in the soil, but take nitrogen from the soil in their process of decomposition after they are turned under. If the seed is planted too soon after the turning under of these crops, there is a very definite lack of nitrogen to stimulate the early growth of the newly planted crops and therefore large amounts of commercial fertilizer must be supplied. With the deep tillage method, as the crops are not turned under, very little decomposition of the green manure crop takes place and the nitrogen native to the soil is left in position to benefit the new seedlings, rather than drawn into the cover crop mass to aid in decomposition.

It will, therefore, be appreciated that the deep tillage method provides a new means of utilizing cover crops to obtain the maximum benefit therefrom and to reduce the amount of commercial fertilizer which must be employed. It will furthermore be appreciated that with the deep tillage method the previous steps of turning under the cover crop, smoothing and reworking the soil, etc., are eliminated, thereby reducing the cost of preparing the soil for planting.

Figure 11:
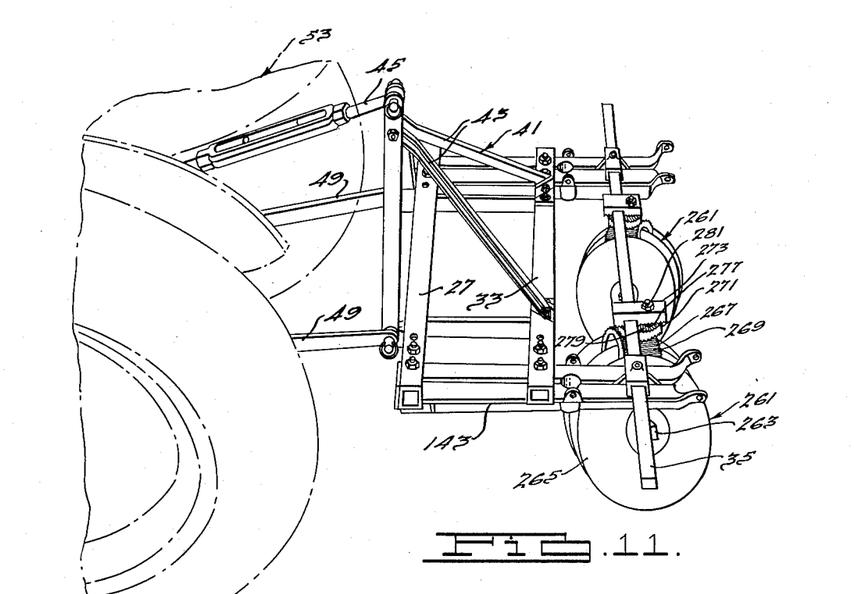
Fig. 11 is a side perspective view of a modified arrangement of the implement illustrated in Fig. 1, wherein the implement is adapted for use as a cultivator.

After the seed has been planted as previously described, and as soon as the plants are up to a stand, it is generally desirable to cultivate the soil. With the implement of this invention, this may be easily accomplished by removing the fertilizing and planting assembly 141, the plow stocks 55, and the furrow forming and closing disks 75 and 103, and replacing these elements with cultivating disk gangs 261, which are mounted on the tool bar 35. The disk gangs 261 are laterally spaced with respect to each other and each comprises an axle 263, on which a plurality of disks 265 are mounted. An inverted U-shaped bracket member 267 rotatably supports the axle 263 and has the outer surface of the upper bight portion thereof serrated at 269. An annular gear-like member 271, having serrations on the bottom face thereof, rests upon the serrated upper portion 269 of the bracket member 267 and the upper surface thereof abuts the under side of the tool bar 35. A block-like member 273 straddles the tool bar 35 and has the bottom face thereof serrated at 277 to mesh with serrations 279 on the upper face of the gear-like member 271. A bolt 281 clamps the members 267, 271 and 273 to the tool bar and by loosening the bolt 281 the angular position of the disk gang may be varied relative to the tool bar. That is, the angular position between the inverted U-shaped bracket member 267 and the gear member 271 may be varied and the rotative position of the gear member 271 may be varied relative to the block member 273. Thus, the disk gang may be set in any adjusted position for cultivating the soil.

One of the primary purposes of cultivation is, of course, to kill weeds, grass, or the like, which tend to interfere with proper growth of the plant. By using the deep tillage method of soil preparation and planting, as previously described, and without prior preparation of the soil, weeds, grass, and the like are moved away from the plant, so as not to inhibit the growth thereof. That is, when the furrow is formed, the surface soil is moved to an outward position. As the surface soil usually has the heaviest infiltration of weeds and grass, the furrow list is made partially free of weeds because of the movement of the topsoil out of the furrow. In subsequent cultivating operations the trench between the cover and furrow acts as a receptacle for the soil that has been turned out. The cultivating disk gangs are preferably set so as to move the earth from the furrow shoulder into the furrow, as can be best seen in Fig. 18. The first cultivation of the plants should be at a time when the weeds first begin germination and the cultivation covers the weeds and smothers them out progressively, which will normally give the plants a thirty day start on the weeds. That is, the weeds are killed by cultivation and after the last cultivation of the plants, as will hereinafter appear, enough topsoil has been moved back into the furrow and killed enough of the weeds, so that the weeds will not interfere with the growth of the crops.

Cultivation furthermore aerates the soil and provides fairly loose friable soil with good capillary action, to aid in promoting root growth. Cultivation of this type is especially advantageous in exceptionally dense soils. Furthermore, as the root growth is substantially below the ground level, due to the placement of the seed and the preparation of the soil, there is no danger of cutting the roots of the plant during the cultivating operation. When the plant being grown is, for example, corn, a second cultivation should be made in a week or ten days after the first cultivation and this second cultivation moves the remainder of the soil from the furrow shoulder to a point adjacent to the plant so that the furrow is completely filled in, as can be seen in Fig. 19. Fig. 19 also illustrates the manner of the root growth of corn, with the deep tillage method. After the corn is about twenty inches tall, the third and last cultivation should be given and after the third cultivation the plant and soil will be disposed in substantially the manner illustrated in Fig. 20. The soil has been taken from each side of the furrow so that the top surface of the furrow is above the normal ground level after the third cultivation.

If additional fertilizer is to be used, it should at this time be applied, and as the roots have reached out from sixteen to twenty inches from the row, it is advisable to place the fertilizer at about this distance from the plants and from eight to ten inches below the surface. The additional application of fertilizer, either of the dry, liquid or gas types, may be accomplished by using only the plow stock and fertilizer mechanisms on the implement, without the use of any of the furrow forming or closing disks. Thus, the fertilizer can be applied at a relatively deep depth, without materially disturbing the topsoil adjacent to the plants.

It will, of course, be appreciated that in addition to mechanical cultivation, control of weeds may be obtained by the use of chemical sprays, without departing from the scope of this invention. The implement of this invention is designed so that satisfactory soil air capacity is maintained, and the weeds properly killed, in a simple manner, and it will surrender no advantage to any other method being followed at the present time, although chemical weed control may be used in place of certain of the cultivating operations.

Figure 12:
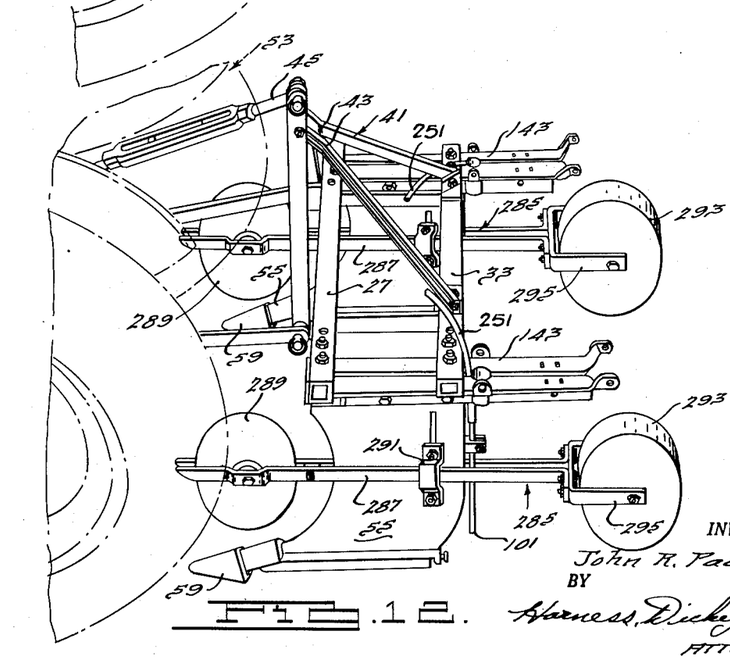
Fig. 12 is a side perspective view of a modified arrangement of the structure illustrated in Fig. 1, wherein the implement is adapted for use in applying liquid fertilizer to the ground after the plant has begun to grow.

The implement of this invention is also designed for sub-surface tilling and fertilizing of pasture lands or other lands where it is desired not to materially alter or disturb the topsoil. For example, if it is desired to enhance the growth of pasture land, the implement may be arranged in the manner illustrated in Fig. 12, wherein the planting and fertilizing subassembly is removed from the main assembly 21 and the furrow forming and closing disks 72 and 103 respectively are detached from the plow stock 55. In the embodiment illustrated in Fig. 12, the implement is arranged to deposit liquid or gas fertilizer in the subsoil and therefore conduit 251 is connected with the liquid fertilizer tube 101, which in turn is connected to a fertilizer tank or other mechanism in any suitable manner, such as previously described. Connected to the plow stock 55 is a device 285 for eliminating any tearing or damage to the topsoil and for compacting the topsoil after the liquid fertilizer has been placed in the subsoil. The device 285 includes a pair of longitudinally extending flat rod members 287, between which, adjacent the forward end thereof, is journaled a cutting disk 289. The rod members 287 are clamped to the plow stock 55, intermediate the ends thereof, by any suitable means such as clamp 291. A heavy roller 293 is rotatably supported between bifurcated ends 295 of the rod members 287, rearwardly beyond the plow stock 55. Therefore, when the implement is dropped into the ground, the plow point 59 will form a subterranean channel below the topsoil of the pasture land. The cutting disk 289 will slice open the topsoil of the pasture land, so that the latter will not be torn by the plow stock as it moves through the soil. Liquid or gas fertilizer is deposited in the subsoil through the tube 101 and by means of the liquid fertilizer applying mechanism previously described, and the roller 293 closes the upper end of the vertical cut in the soil, so as to in effect seal the fertilizer in the soil below the ground level so that it will not be readily dissipated and a large percent of its efficacy and effect lost.

It will thus be seen that this implement may be readily adapted for use as a fertilizer applying device when it is desired not to disturb the topsoil but only to enhance the growth of the grass, clover or other matter growing on the soil. It will, of course, be appreciated that if it is desired to surface harrow pasture land or the like, while at the same time fertilizing the land, this can be accomplished by removing the device 285 and connecting suitable harrowing disks to the plow stock or tool bar, in a manner such as that previously described.

From the foregoing, it can thus be appreciated that the implement and methods of this invention have a wide variety of uses in the preparation, planting and cultivating of soil and plants, and it will be appreciated that this implement will work soil in a much more efficient and economical manner than has been possible in the past and will produce greater crop yields than has been possible heretofore, with a minimum of expense, cost and work.

What is claimed is:

1. An earth-working implement comprising an upright plate-like stock of substantial vertical extent mounted for movement through the ground to produce a slit not substantially wider than the thickness of the plate, said stock having a forward cutting edge concave in form and having its rearmost portion intersecting the ground surface line during movement, angularly and vertically adjustable bearing means mounted on each side of said stock and spaced rearwardly from said rearmost portion of said cutting edge, and an outwardly concave cutting disk journaled on each of said bearing means with said disks converging forwardly and with the forwardmost portions of the edges of said disks substantially tangent to the cutting edge of said stock at said rearmost portion, the adjustability of said bearing means providing for adjustment of said disks to positions with said forwardmost portions of the edges of the disks substantially tangent to said cutting edge at points along said rearmost portion; whereby during movement said stock will form a slit in the ground and the disks will form furrows on each side of said slit and field trash engaged by said stock will gather in front of said rearmost portion and be cut by the forward edges of said disks.

2. An earth-working implement comprising an upright plate-like stock of substantial vertical extent mounted for movement through the ground, said stock having an upwardly extending cutting edge so disposed as to tend to cause upward movement of fibrous material encountered by said edge, and intersecting the ground surface at a predetermined point during movement, angularly and vertically adjustable bearing means mounted on each side of said stock and spaced rearwardly from said cutting edge, and an outwardly concave cutting disk journaled on each of said bearing means with said disks converging forwardly and with the forwardmost portions of the edges of said disks substantially tangent to the cutting edge of said stock at said predetermined point, the adjustability of said bearing means providing for adjustment of said disks to positions with the forwardmost portions of the edges of the disks substantially tangent to said cutting edge at points along said edge; whereby said disks may be positioned with said point of tangency with said cutting edge at said predetermined point, while said disks penetrate the ground a variable amount.

3. An earth-working implement comprising an upright plate-like stock of substantial vertical extent mounted for movement through the ground to produce a slit not substantially wider than the thickness of the plate, said stock having an upwardly extending cutting edge so disposed as to tend to cause upward movement of fibrous material encountered by said edge, and intersecting the ground surface at a predetermined point during movement, angularly and vertically adjustable bearing means mounted on each side of said stock and spaced rearwardly from said cutting edge, and an outwardly concave cutting disk journaled on each of said bearing means with said disks converging forwardly and with the forwardmost portions of the edges of said disks substantially tangent to said cutting edge of said stock at said predetermined point, the vertical adjustability of said bearing means providing for positioning of said disks to penetrate the ground alongside of said stock in variable amounts while the angular adjustability of said bearing means provides for positioning the forwardmost portions of the edges of said disks substantially tangent to said cutting edge of said stock at said predetermined point regardless of the depth to which said disks are adjusted.

References Cited in the file of this patent

UNITED STATES PATENTS

| | | |
|---|---|---|
| 15,654 | Hoyt | Sept. 2, 1856 |
| 25,464 | Williams | Sept. 13, 1859 |
| 31,108 | Cameron | Jan. 15, 1861 |
| 98,120 | Strait | Dec. 21, 1869 |
| 277,987 | Buchanan | May 22, 1883 |
| 548,590 | Poole | Oct. 22, 1895 |
| 565,352 | Hickman | Aug. 4, 1896 |
| 657,654 | Fowler | Sept. 11, 1900 |
| 819,390 | Warren | May 1, 1906 |
| 870,432 | Higley | Nov. 5, 1907 |
| 921,557 | Mussetter | May 11, 1909 |
| 991,452 | Park | May 2, 1911 |
| 1,002,344 | Watson | Sept. 5, 1911 |
| 1,004,238 | Brooks | Sept. 26, 1911 |
| 1,038,084 | Carroll | Sept. 10, 1912 |
| 1,226,515 | Hicks | May 15, 1917 |
| 1,229,194 | Patric | June 5, 1917 |
| 1,247,744 | Trimble | Nov. 27, 1917 |
| 1,613,648 | Delaurier | Jan. 11, 1927 |
| 1,736,442 | Hill | Nov. 19, 1929 |
| 1,823,244 | White | Sept. 15, 1931 |
| 1,823,529 | Cathey | Sept. 15, 1931 |
| 1,832,021 | Hand | Nov. 17, 1931 |

(Other references on following page)

UNITED STATES PATENTS

| | | | |
|---|---|---|---|
| 1,851,862 | Nelson | Mar. 29, | 1932 |
| 1,868,588 | Romera | July 26, | 1932 |
| 1,869,923 | Stevens | Aug. 2, | 1932 |
| 1,956,697 | Rognerud | May 1, | 1934 |
| 1,962,116 | Atwater | June 12, | 1934 |
| 2,024,778 | Ray | Dec. 17, | 1935 |
| 2,159,652 | Brunner | May 23, | 1939 |
| 2,190,359 | Hipple | Feb. 13, | 1940 |
| 2,212,147 | Bittner | Aug. 20, | 1940 |
| 2,222,015 | Bateman | Nov. 19, | 1940 |
| 2,227,670 | Peterson | Jan. 7, | 1941 |
| 2,285,932 | Leavitt | June 9, | 1942 |
| 2,292,909 | Thomas et al. | Aug. 11, | 1942 |
| 2,364,958 | Drennan | Dec. 12, | 1944 |
| 2,375,850 | Johnson | May 15, | 1945 |
| 2,415,251 | Leavitt | Feb. 4, | 1947 |
| 2,439,743 | McEwen | Apr. 13, | 1948 |

FOREIGN PATENTS

| | | | |
|---|---|---|---|
| 149,325 | France | June 5, | 1882 |
| 161,192 | France | Mar. 26, | 1884 |
| 843,895 | France | Apr. 3, | 1939 |